United States Patent [19]

Carlton

[11] Patent Number: 4,741,642
[45] Date of Patent: May 3, 1988

[54] SAFETY JOINT FOR ROBOTIC ARM

[75] Inventor: Richard J. Carlton, Santa Clara, Calif.

[73] Assignee: Phase 2 Automation, Sunnyvale, Calif.

[21] Appl. No.: 932,234

[22] Filed: Nov. 19, 1986

[51] Int. Cl.⁴ .................. F16B 7/06; B25J 19/00
[52] U.S. Cl. .................. 403/59; 403/229; 403/291; 901/49; 901/29
[58] Field of Search .......... 403/2, 27, 13, 59, 229, 403/291, 121, 73, 74; 901/49, 29, 47

[56] References Cited

U.S. PATENT DOCUMENTS

| | | | |
|---|---|---|---|
| 2,073,089 | 3/1937 | Autenrieth | 403/59 X |
| 4,514,616 | 4/1985 | Warner | 901/49 X |
| 4,540,331 | 9/1985 | Stanner et al. | 901/49 X |
| 4,595,334 | 6/1986 | Sharon | 901/29 X |
| 4,639,184 | 1/1987 | Knasel et al. | 901/49 X |
| 4,655,674 | 4/1987 | Kohler et al. | 901/49 X |
| 4,700,932 | 10/1987 | Katsuno | 901/49 X |

Primary Examiner—Randolph A. Reese
Assistant Examiner—Peter M. Cuomo
Attorney, Agent, or Firm—Paul F. Wille

[57] ABSTRACT

An improved joint for connecting an end effector to a robotic arm is described. The joint includes a spring for supporting the weight of the end effector, a plurality of ball and socket locating members, and a plurality of ball plungers. The ball plungers are located adjacent a platform connected to the robotic arm to effect a snap-like trip point when struck.

7 Claims, 1 Drawing Sheet

SAFETY JOINT FOR ROBOTIC ARM

BACKGROUND OF THE INVENTION

This invention relates to robotic devices and, in particular, to a joint for connecting an end effector to a robotic arm.

In the prior art, a host of different kinds of end effectors have been provided for the many uses of industrial robots. Examples include welding, painting, and article handling via various gripper mechanisms. These end effectors can be attached to a robotic arm by a variety of means. Some are simply directly attached.

A problem arises when end effectors are directly attached to a robotic arm. Any misalignment of the system or anything out of place can cause a collision with the end effector and considerable damage, whether to the end effector, the robotic arm, or some other article.

One approach to the problem is to monitor the current through the servomotors or pumps used to drive the system. The difficulty here is that the rapid motion of the robotic arm requires high torque which, in turn, itself requires high current during acceleration of the arm. Thus, an overcurrent condition becomes difficult to distinguish from normal operations.

Another approach has been to provide various forms of breakaway mechanisms for the arm. In this context, "breakaway" refers to the ability to yield for a predetermined distance upon impact, not that the end effector is separated from the arm.

Joints of the prior art, while providing some breakaway, are limited in the number of axes of motion they can accommodate. In the case of a pneumatic cylinder for example, the joint yields only along the axis of the cylinder. Other, more complicated mechanisms have been provided, but none yield in all axes. Further, even after yielding, they are difficult to restore to their initial alignment with respect to the robotic arm or some other reference.

In view of the foregoing, it is therefore an object of the present invention to provide an improved joint for robotic arms.

Another object of the present invention is to provide a joint capable of yielding in all axes.

A further object of the present invention is to provide a joint which can be restored to its initial alignment easily.

SUMMARY OF THE INVENTION

The foregoing objects are achieved in the present invention wherein first and second mounting means are interconnected by a spring for supplying an unseating trip assistance force opposed to the weight of an object attached to the second mounting means. Linear motion is checked by a platform surrounded by at least three ball plungers. Rotational motion is checked by a ball and socket assembly. Complex motions are checked by these elements in a cooperative combination. The unseating trip assistance force is preferably only slightly less than the minimum weight of the end effector to afford high sensitivity. Optical sensing means assist in detecting misalignment.

BRIEF DESCRIPTION OF THE DRAWINGS

A more complete understanding of the present invention can be obtained by considering the following detailed description in conjunction with the accompanying drawings, in which.

DETAILED DESCRIPTION OF THE INVENTION

Figure 1:
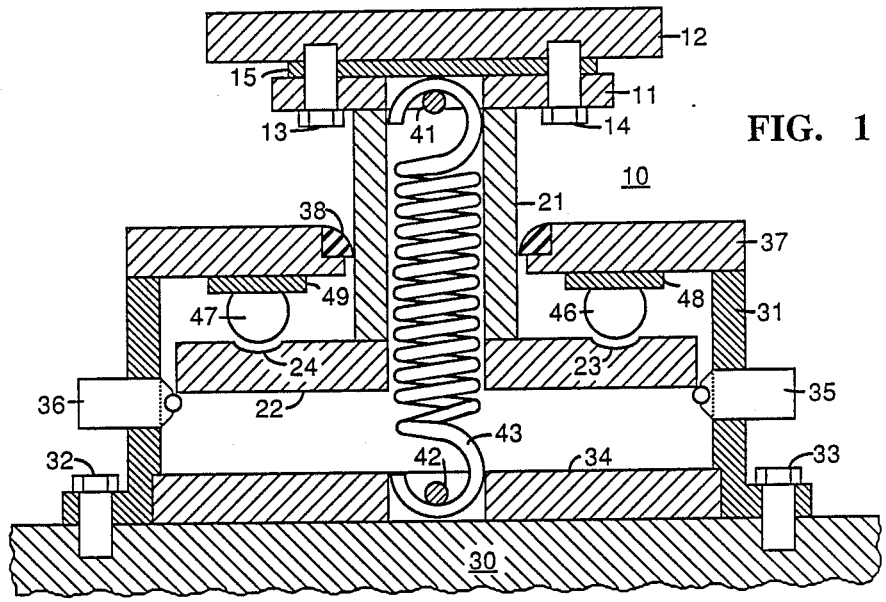
FIG. 1 illustrates a preferred embodiment of the present invention.

FIG. 1 illustrates a preferred embodiment of the present invention in which, basically, a loosely fitting piston and cylinder are held together by a spring. Specifically, joint 10 comprises a first mounting plate 11 attached to support 12 by any suitable means such as bolts 13 and 14. Support 12 may comprise, for example, the arm of a robot or other support to which an end effector must be connected. If desired, mounting means 11 and support 12 can be separated by shim 15 to aid in the alignment of joint 10. Further, depending upon an application, shim 15 may comprise resilient material. Attached to mounting plate 11 is cylindrical member 21 which has platform 22 attached to the other end thereof. Platform 22 is preferably in the form of an annular disc.

The other side of joint 10 is connected to member 30 which may, for example, comprise an end effector. Cylindrical member 31 is attached to member 30 by any suitable means such as bolts 32 and 33. As illustrated in FIG. 1, mounting plate 34 is trapped against member 30 by the shoulders formed in cylindrical member 31. Mounting plate 11 and mounting plate 34 have pins 41 and 42 attached thereto, respectively. Interconnecting these pins is spring 43, although any suitable resilient means can be used.

As presently described, member 30 and support 12 are held together only by spring 43 which provides little or no location of the respective members. Spring 43 is chosen such that the assistance force supplied by spring 43 is slightly less than the weight of member 30 and whatever may be attached to member 30.

To support the remainder of the weight of member 30, plate member 37 is attached to cylindrical member 31. Plate member 37 preferably comprises an annular disc having sealing means 38 about the inner diameter thereof. With plate member 37 in place, a chamber is formed containing platform 22. Platform 22 has an outer diameter somewhat less than the inside diameter of cylinder 31. The inner diameter of plate member 37 is greater than the outside diameter of cylindrical member 21. Thus, platform 22 is capable of moving freely within the chamber formed by the elements described thus far. Also within the chamber and located above platform 22 are tooling balls 46 and 47 attached to member 37 by ball studs 48 and 49. Located opposite balls 46 and 47 are sockets 23 and 24 respectively. A third ball and socket combination is employed but not depicted in FIG. 1.

As presently described, with joint 10 attached to member 30, the housing formed by mounting plate 34, cylinder 31 and member 37 is pulled downward, as the joint is illustrated in FIG. 1. Opposing this downward motion is the assistance force supplied by spring 43, which is inadequate to support the weight of member 30. Thus balls 46 and 47 come to rest in sockets 23 and 24. In a preferred embodiment of the present invention, spring 43 supplies a assistance force that is almost equal to but less than the weight of member 30. For example, a gripper mechanism and associated hardware might weigh approximately fifty pounds. Spring 43 is chosen to supply a restoring force of forty-four to forty-eight pounds. Thus, while balls 46 and 47 come to rest in sockets 23 and 24, it takes very little force to upset the alignment provided by the balls and sockets. In a preferred embodiment of the present invention there are three ball and socket sets. One is not illustrated in FIG. 1 since it is located behind cylindrical member 21.

Located in cylindrical member 31 are ball plungers 35 and 36. Ball plungers 35 and 36 are located a predetermined distance from member 37 so that platform 22 is located vertically such that balls 46 and 47 are seated firmly in sockets 23 and 24. In the event of unintended contact between member 30 and some other article, ball plungers 35 and 36 provide a breakaway action, letting platform 22 travel through the chamber.

In one embodiment of the present invention, cylinder 21 had an outside diameter of 1.5 inches (37 mm.) while the inside diameter of member 37 was 2.19 inches (56 mm.). Cylinder 31 had an inside diameter of 5.19 inches (132 mm.) while platform 22 had an outside diameter of 5.12 inches (130 mm.). The height of cylindrical member 31 from member 37 to mounting means 34 was 1.56 inches (40 mm.) and from platform 22 to mounting means 34 was 0.69 inches (17 mm.). Balls 46 and 47 had a diameter of 0.50 inches (13 mm.). These dimensions are by way of example only and are in no way exhaustive of the present invention. They are present here merely to illustrate that the elements interconnected by the resilient means are loosely fitted.

As thus constructed, joint 10 enables one to obtain motion along all axes, that is both linear motion and rotation. Cylinder 21 fits loosely within the central bore of member 37 and platform 22 fits loosely within the bore of cylinder 31. Thus, member 30 can swing side to side in any direction. Similarly, member 30 can freely move up and rotate about the axis of joint 10. Also, because of the looseness of fit, joint 10 enables member 30 to move side to side, as illustrated in FIG. 1 and into and out of the plane of FIG. 1, or a motion which is a combination of these directions. By virtue of the ball and socket sets, any rotation of member 30 is readily corrected by the seating action of the balls and sockets so that member 30 can be quickly restored to its initial alignment.

Figure 2:
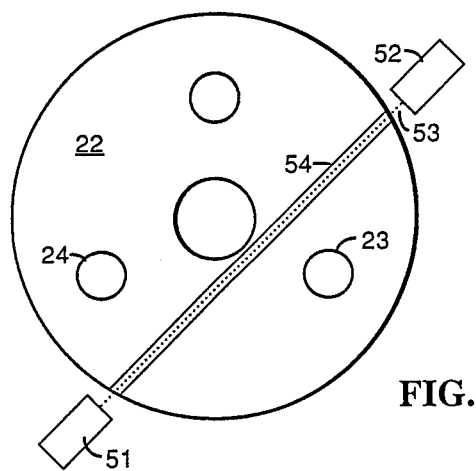
FIG. 2 illustrates an optical sensing means in accordance with the present invention.

FIG. 2 illustrates an optical detector useful with the present invention for further enhancing the alignment of platform 22 relative to member 30. Specifically, an optical emitter 51 and optical sensor 52 are connected by beam 53 traveling in a slit or tunnel 54. Sensor 52 can provide an indication to the controller that the safety joint has been misaligned, thereby causing a shutdown of the robot. Similarly, during start-up, sensor 52 is used to detect alignment of platform 22 relative to member 30, both rotational alignment and the seating of platform 22 in the proper plane.

There is thus provided by the present invention a relatively simple mechanism which provides a yielding joint between a robotic arm and an end effector. The joint permits axes of movement yet is relatively simple mechanically.

Having thus described the invention it will be apparent to those of skill in the art that various modifications can be made within the spirit and scope of the present invention. For example, sockets 23 and 24 need not have a complementary shape to the ball but can be formed by bores through platform 22 having the upper end thereof counter sunk to accept balls 46 and 47.

Similarly, spring 43 is merely illustrative of any suitable means for providing a trip assistance force. Other means such as pneumatic devices are also suitable. The particular location of ball plungers 35 and 36 depends upon the feature on platform 22 used as a reference. As illustrated in FIG. 1 the lower edge of platform 22 is used as a reference. Alternatively, one could provide an annular groove in the outside edge of platform 22 and have ball plungers 35 and 36 locate platform 22 by that groove. The number and location of ball plungers is not critical, although four ball plungers uniformly spaced about the perimeter of platform 22 is preferred. Similarly, the number of ball and socket sets is not critical although it is preferred to use three ball and socket sets uniformly located about the surface of the platform 22. While several components are illustrated as made from separate pieces, this is for the sake of illustration only. For example, elements 11 and 21 make a single component which can be formed, shaped, or cast as a single piece. The same is true for elements 31 and 37 or 31 and 34. Further, one can connect the chamber to the robotic arm and the platform to the end effector, i.e. the apparatus of FIG. 1 can be connected upside-down.

I claim:

1. A mechanical joint comprising:
   a cylindrical member having a cylindrical sidewall and upper and lower walls which define a chamber therein;
   A platform moveable and rotatable within said chamber, said platform defining at least one socket on an upper surface thereof;
   ball means attached to the upper wall and extending into said chamber for engaging said socket;
   resilient means connected between said cylindrical member and said platform for urging said platform away from said upper wall; and
   a plurality of ball plungers extending through the sidewall of said cylindrical member for retaining said platform member within said cylindrical member.

2. The joint as set forth in claim 1 wherein said platform comprises a plurality of sockets on the upper surface thereof and wherein said ball means engages said plurality of sockets.

3. The joint as set forth in claim 2 wherein said ball means are located in respective ones of said sockets when said platform is located at a predetermined position within said chamber.

4. The joint as set forth in claim 3 and further comprising:
   optical means for detecting the position of said platform member within said chamber.

5. The joint as set forth in claim 4 wherein said optical means comprises an optical emitter and an optical detector defining an optical path therebetween, and said platform contains a feature aligned with siad optical path in said predetermined position.

6. The joint as set forth in claim 1 and further comprising:
   first means for attaching said cylindrical member to an article; and
   second means for attaching said platform to a support.

7. The joint as set forth in claim 6 wherein said upper wall has a central aperture through which said second means extends.

* * * * *